(12) United States Patent
Shapovalov et al.

(10) Patent No.: US 7,776,796 B2
(45) Date of Patent: Aug. 17, 2010

(54) METHODS OF TREATING WELLBORES WITH RECYCLABLE FLUIDS

(75) Inventors: Alexander Shapovalov, Lafayette, LA (US); Alejandro Pena, Ciudad Ojeda (VE); Bernhard Lungwitz, Vernal, UT (US); Rene Schuurman, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1036 days.

(21) Appl. No.: 11/464,931

(22) Filed: Aug. 16, 2006

(65) Prior Publication Data

US 2007/0215355 A1 Sep. 20, 2007

Related U.S. Application Data

(60) Provisional application No. 60/784,021, filed on Mar. 20, 2006.

(51) Int. Cl.
*E21B 37/06* (2006.01)
*C09K 8/52* (2006.01)

(52) U.S. Cl. ............. 507/211; 507/248; 507/267; 507/276; 507/277; 507/927; 166/305.1; 166/311; 166/312

(58) Field of Classification Search .............. None
See application file for complete search history.

(56) References Cited

U.S. PATENT DOCUMENTS

| | | | |
|---|---|---|---|
| 3,692,676 A | | 9/1972 | Culter et al. |
| 3,937,283 A | | 2/1976 | Blauer et al. |
| 4,190,113 A | * | 2/1980 | Harrison ............ 166/311 |
| 4,199,484 A | | 4/1980 | Murphey |
| 4,368,136 A | | 1/1983 | Murphey |
| 4,671,359 A | * | 6/1987 | Renfro ............ 166/312 |
| 4,744,420 A | * | 5/1988 | Patterson et al. .......... 166/312 |
| 5,175,278 A | | 12/1992 | Peik et al. |
| 5,620,947 A | * | 4/1997 | Elward-Berry ........... 507/229 |
| 5,688,844 A | | 11/1997 | Chatterji et al. |
| 5,782,300 A | | 7/1998 | James et al. |
| 5,783,526 A | * | 7/1998 | Dobson et al. ........... 507/261 |
| 6,110,271 A | | 8/2000 | Skaggs et al. |
| 6,221,152 B1 | | 4/2001 | Dial et al. |
| 6,227,295 B1 | * | 5/2001 | Mitchell et al. ........... 166/300 |
| 6,432,885 B1 | * | 8/2002 | Vollmer ............. 507/236 |
| 6,482,866 B1 | | 11/2002 | Dahayanake et al. |
| 6,599,863 B1 | | 7/2003 | Palmer et al. |
| 6,620,775 B2 | | 9/2003 | Winston et al. |
| 6,703,352 B2 | | 3/2004 | Dahayanake et al. |
| 6,720,290 B2 | * | 4/2004 | England et al. ........... 507/244 |
| 7,290,615 B2 | * | 11/2007 | Christanti et al. ........... 166/312 |
| 2003/0100460 A1 | | 5/2003 | Winston et al. |
| 2004/0121932 A1 | | 6/2004 | Griese et al. |
| 2005/0261138 A1 | | 11/2005 | Robb et al. |

FOREIGN PATENT DOCUMENTS

| | | |
|---|---|---|
| EP | 0 209 277 | 4/1990 |
| WO | 9722564 | 6/1997 |

OTHER PUBLICATIONS

R.C. Navarrete, J.M. Seheult, M.D. Coffey; "New Bio-Polymers for Drilling, Drill-In, Completions, Spacer Fluids and Coiled Tubing"; Proceedings from IADC/SPE Asia Pacific Drilling Technol. Conference; Sep. 11-13, 2000.*
IADC SPE 62790—New Bio-Polymers for Drilling, Drill-In, Completions, Spacer Fluids and Coiled Tubing Applications—R.C. Navarrete et al.—presented at the 2000 IADC/SPE Asia Pacific Drilling Technology held in Kuala Lumpur, Malaysia, Sep. 11-13, 2000.
Pollock, T.J., Sphingan Group of Exopolysaccharides (EPS), in Biopolymers, vol. 5, E.J. Vandamme, S. DeBaets, and A. Steinbuuchel, Editors. 2002, Wiley-VCH Verlag GmbH. p. 239-258.
Kuo, M.S., A.J. Mort, and A. Dell, Identification and location of L-glycerate, an unusual acyl substituent in gellan gum. Carbohydrate Research, 1986. 156: p. 173-187.
Stankowski, J.D. and S.G. Zeller, Location of the O-acetyl group in welan by the reductive-cleavage method. Carbohydrate Research, 1992. 224: p. 337-341.
Chowdhury, T.A., et al., Structural studies of an extracellular polysaccharide, S-657, elaborated by Xanthomonas ATCC 53159. Carbohydrate Research, 1987. 164: p. 117-122.
Jansson, P.E., et al., Structural studies of a polysaccharide (S-194) elaborated by Alcaligenes ATCC 31961. Carbohydrate Research, 1986. 156: p. 157-163.
Jannson, P.E., N.S. Kumar, and B. Lindberg, Structural studies of a polysaccharide (S-88) elaborated by Pseudomonas ATCC 31554. Carbohydrate Research, 1986. 156: p. 165-172.
Chowdhury, T.A., B. Lindberg, and U. Lindquist, Structural studies of an extracellular polysaccharide (S-198) elaborated by Alcaligenes ATCC 31853. Carbohydrate Research, 1987. 161: p. 127-132.
Diltz, S. and S.G. Zeller, Location of O-acetyl groups in S-657 using the reductive-cleavage method. Carbohydrate Research, 2001. 331: p. 256-270.
SPE 80242—A Circulating Foam Loop for Evaluating Foam at Conditions of Use By Richard D. Hutchins, Matthew J. Miller.

\* cited by examiner

*Primary Examiner*—James Seidleck
*Assistant Examiner*—John J Figueroa
(74) *Attorney, Agent, or Firm*—Rachel Greene; David Cate; Robin Nava

(57) ABSTRACT

Methods for treating wellbores using fluids containing a sphingan heteropolysaccharide which contributes viscosity stability and a decrease in friction pressure. Some methods are clean-out operations using recyclable-viscosity fluids containing at least a sphingan heteropolysaccharide and an optional salt. Others include methods of pumping fluids incorporating sphingan heteropolysaccharides to reduce pumping frictional pressure.

24 Claims, No Drawings

METHODS OF TREATING WELLBORES WITH RECYCLABLE FLUIDS

RELATED APPLICATION DATA

This patent application is a non-provisional application based upon provisional application Ser. No. 60/784,021, filed Mar. 20, 2006, and claims the benefit of the filing date thereof.

BACKGROUND OF THE INVENTION

This invention relates to fluids and methods used in treating a wellbore penetrating a subterranean formation. In particular, this invention refers to methods for well clean-out applications using recyclable viscosity fluids containing a sphingan heteropolysaccharide.

In wellbore cleanout operations, the objective is removal of wellbore fill material, such as sand, scale or organic materials, and other debris, from the wellbore. Many reservoirs produce some sand or fines that may not be carried to surface in the produced fluid. Accumulations of fill material may eventually increase in concentration within the lower wellbore, possibly restricting production. Cleanouts using coiled tubing, snubbing or hydraulic workover techniques are performed routinely to remove wellbore fill. The term wellbore cleanout is also known as well workover and intervention.

A typical wellbore cleanout operation involves preparing at the surface of a wellsite conventional polymer based viscous fluid of density adequate to reach the bottom of the wellbore, and injecting the fluid into the wellbore. A port of the fluid is then returned to the surface by circulation, to remove wellbore fill material. Due to exposure to the extreme wellbore conditions, as well as degradation due to techniques for removal of the wellbore fill material, the fluid generally loses viscous properties required further cleanout treatments, and must either be discarded, or mixed with fresh fluid, in order to reuse the fluid.

Therefore, the need exists for wellbore cleanout methods which overcome the necessity to either discard at least a portion of cleanout fluid after a single treatment or significant replenishment with fresh fluid. A method that can achieve the above would be highly desirable, and the need is met at least in part by the following invention.

SUMMARY OF THE INVENTION

Embodiments of the invention provide methods for fluid delivery and reuse, where the fluids comprise a sphingan heteropolysaccharide which contributes viscosity stability and a decrease in friction pressure. In some embodiments, the invention refers to methods for well clean-out applications using recyclable-viscosity fluids containing at least a sphingan heteropolysaccharide and an optional salt. In others, the invention refers to the methods of pumping fluids incorporating sphingan heteropolysaccharides to reduce pumping frictional pressure.

In one embodiment method of performing wellbore cleanout operation is provided. The method includes preparing a fluid containing at least an aqueous medium, an electrolyte, and a heteropolysaccharide with a tetrasaccharide repeating unit in the polymer backbone as represented by the chemical formula:

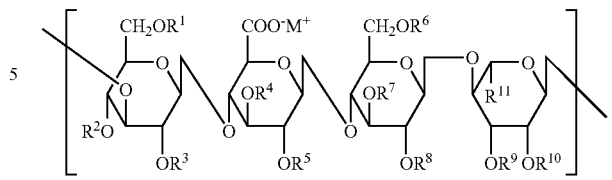

wherein at least three different saccharides are present in the repeating unit, such saccharides including D-glucose, D-glucuronic acid, and either L-rhamnose or L-mannose; M+ is an ionic species; $R^1$, $R^2$, $R^3$, $R^4$, $R^5$, $R^6$, $R^7$, $R^8$, $R^9$, and $R^{10}$ are selected from the group consisting of hydrogen, methyl, acetyl, glyceryl, or a saccharide group containing one to three saccharides units; $R^{11}$ is a methyl or methylol group; and the weight average molecular weight (Mw) for the heteropolysaccharide is from about $10^5$ to about $10^7$. The fluid is injected into the wellbore, to entrain wellbore fill material. At least a part of the fluid is then recovered at the surface, and a substantial amount of the entrained wellbore fill material is separated from the fluid. The fluid is again injected into the wellbore for a second or more subsequent cycles. In this embodiment, significant replenishment of the heteropolysaccharide is not required.

In another embodiment a method of treating a wellbore is given. This method includes preparing an aqueous fluid containing at least a sphingan heteropolysaccharide and electrolyte. The fluid is then injected into the wellbore for a first cycle, and at least a portion recovered at the surface wherein no significant change in viscosity properties of the recovered fluid occurs after the injection for the first cycle. The portion is then injected into the wellbore for a second cycle.

In yet another embodiment, the method relates to reducing the frictional pressure of a fluid composition pumped through a tube by incorporation of a sphingan heteropolysaccharide as a component of the fluid composition. The tube may be a component of a coiled tubing unit, and the pumping flowrate of the fluid may be about 9.5 $m^3/h$ or greater. Also, the outer diameter of the tube may be about 4.5 cm or less.

DETAILED DESCRIPTION

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components others than the ones already cited. In the summary of the invention and this detailed description, each numerical value should be read once as modified by the term "about" (unless already expressly so modified), and then read again as not so modified unless otherwise indicated in context. Where a range is stated, it is conceded by the reader that the inventors recognize all numerical values along the continuum within the range, and that all values within the range may serve as minimum or maximum endpoints of the range.

The invention discloses to methods used for wellbore clean-out treatments. In particular, this invention refers to methods for wellbore clean-out applications using novel aqueous fluids containing at least a sphingan heteropolysaccharide. Inventors have discovered that the fluids used in the invention exhibit good temperature stability, as well as improved viscosity and solid suspending characteristics over commonly used fluids. These characteristics result in a robust viscous fluid which, upon repeated exposure to extreme wellbore conditions, does not significantly lose viscosity properties. This makes possible the use of the fluid for any practical number of repeating wellbore cleanout cycles, and avoids the need for either substantial disposal or replenishment of significant volumes of fluid after individual cleanout cycles. Hence, the fluids used in accordance with the invention are recyclable viscosity fluids. The term "recyclable viscosity" means the fluid substantially maintains the viscosity characteristics required to function as a treatment fluid, after exposure to wellbore and/or formation conditions. As such, recyclable viscosity means no significant change in fluid viscosity which renders the fluid significantly less functional occurs after the injection and recovery for at least one cycle.

The number of treatment cycles for which the fluids may be used is not necessarily limited, so long that there is no requirement for significant replenishment of the fluid, or fluid ingredients, in order to maintain the intended function of the fluid in the treatment. Thus, the fluid may be cycled at least two times, and perhaps, three, four, five, six, seven, ten, fifteen, twenty, and so on. Essentially any integer of two or greater is possible so long that there is no significant replenishment of the fluid or fluid ingredients and the fluid functions as intended. Replenishment does not include supplementing with fluid or fluid ingredients to overcome leak-off into the formation.

A cycle, or treatment cycle, as used herein, unless otherwise indicated, means the portion of a treatment where the volume of fluid entraining wellbore-fill recovered from the well, as well as the volume of fluid which may leak-off into the formation, is essentially equal to the volume pumped into the wellbore. In those cases where no significant leak-off occurs, in a cycle, the recovered volume should be essentially equal to the pumped volume. In instances where leak-off occurs, only a portion of the pumped volume may be recovered, and techniques for determining the leak-off rate and volume are readily known to those with skill in the art.

Fluids useful in method embodiments of the invention are aqueous fluids containing a heteropolysaccharide, and an optional electrolyte. The aqueous medium to prepare the fluid is usually water or brine. The electrolyte may be used to adjust the density of the fluid so the fluid may effectively treat the length of the wellbore. When the electrolyte is used to adjust density, those skilled in the art will appreciate that 1% w/v means one percent weight-to-volume ratio, and corresponds to a concentration of electrolyte mass of 10 kg/m$^3$ (10 g/l) of liquid phase volume. Thus, as defined, the weight-to-volume ratio represents the grams of solute (electrolyte) in the liters of liquid solution (not including any gas component), and it includes electrolyte that may be either dissolved or suspended in the solution at room temperature. Fluids useful in the invention have a density value, in the absence of a gas component, from about 1.0 to about 2.3 kilogram per liter (kg/l), from about 1.1 to about 2.1 kg/l, or even from about 1.3 to about 1.9 kg/l.

Some embodiments of the invention are methods of wellbore cleanout. The objective in a wellbore cleanout operation is substantial collection of wellbore fill material (such as sand, scale or organic materials, and any other debris or unwanted material) from the wellbore. Many reservoirs produce some sand or fines that may not be carried to surface in the produced fluid. Accumulations of fill material may eventually increase in concentration within the lower wellbore, possibly restricting production. Cleanouts are typically conducted using coiled tubing, snubbing or hydraulic workover techniques.

In a clean-out operation, the fluids are prepared and injected into the wellbore. While moving through the wellbore, the fluids entrain wellbore fill material. That is, the fluids draw in and transport the wellbore fill material. Portions of the fluid entraining the fill material are then collected at the surface, and the fill material is substantially separated from the fluid, by any practical separation technique.

Other embodiments of the invention include use of the fluids for drilling, drill-in, displacement, completion, hydraulic fracturing, work-over, packer fluid emplacement or maintenance, well treating, testing, or abandonment, by non-limiting example.

The fluids used in the invention may also contain a gas component. As used herein, the term "liquid phase" is meant to include all components of the fluid except the gas phase, and is equivalent with the use of the term "fluid" when a gas component is not present. The term "gas" is used herein to describe any fluid in a gaseous state or in a supercritical state, wherein the gaseous state refers to any state for which the temperature of the fluid is below its critical temperature and the pressure of the fluid is below its vapor pressure, or the temperature of the fluid is above its critical temperature and the pressure of the fluid is below its critical pressure, and the supercritical state refers to any state for which the temperature of the fluid is above its critical temperature and pressure. As used herein, the terms "energized fluid" and "fluid" are used interchangeably to describe any stable mixture of gas phase and liquid phase, including foams, notwithstanding the foam quality value, i.e. the ratio of gas volume to the total volume of gas and liquid phases.

Energized fluids are formed and applied by injecting an aqueous solution concomitantly with a gas (most commonly nitrogen, carbon dioxide or their mixtures). The dispersion of the gas into the base fluid in the form of bubbles increases the viscosity of such fluid and impacts positively its performance. The presence of the gas also enhances the flowback of the fluid. It is commonly known that stable energized fluids or foams with rheology properties suitable for oilfield operations becomes increasingly difficult when the formation temperature is above 121° C., or even up to 150° C.

The gas component, when used in fluids, may be produced from any suitable gas that forms an energized fluid when introduced into the aqueous medium. See, for example, U.S. Pat. No. 3,937,283 (Blauer et al.) hereinafter incorporated by reference. Preferably, the gas component comprises a gas selected from the group consisting of nitrogen, air, carbon dioxide and any mixtures thereof. More preferably the gas component comprises nitrogen, in any quality readily available. The gas component may assist in the well clean-up process. The fluid may contain from about 10% to about 90% volume gas component based upon total fluid volume percent, preferably from about 30% to about 80% volume gas component based upon total fluid volume percent, and more preferably from about 40% to about 70% volume gas component based upon total fluid volume percent.

Fluids used according to the invention include a heteropolysaccharide. While any suitable heteropolysaccharide may be used, microbial polysaccharides commonly known as sphingans are particularly useful. Sphingans generally are acidic capsular heteropolysaccharides secreted by Sphingomonas bacteria as described by Pollock, T. J., Sphingan Group of Exopolysaccharides (EPS), in Biopolymers, Vol. 5, E. J. Vandamme, S. DeBaets, and A. Steinbüchel, Editors. 2002, Wiley-VCH Verlag GmbH, p. 239-258. In some embodiments of the invention, the heteropolysaccharide is an sphingan or a derivatized sphingan having a tetrasaccharide repeating unit in the polymer backbone as represented by the chemical formula:

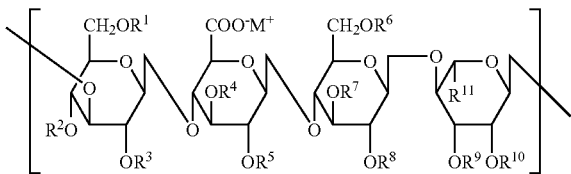

or represented by the alternative formula scheme:

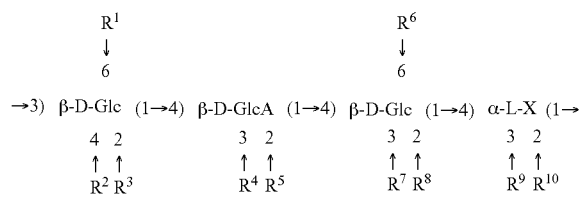

wherein $R^1$, $R^2$, $R^3$, $R^4$, $R^5$, $R^6$, $R^7$, $R^8$, $R^9$, and $R^{10}$ are selected from the group consisting of hydrogen, methyl, acetyl, glyceryl, or a saccharide group containing one to three saccharides units; $R^{11}$ is a methyl or methylol group; wherein at least three different saccharides are present in the repeating unit, such saccharides including D-glucose (D-Glc), D-glucuronic acid (D-GlcA), and either L-rhamnose (X=Rha; $R^{11}$=$CH_3$) or L-mannose (X=Man; $R^{11}$=$CH_2OH$); the weight average molecular weight (Mw) for the heteropolysaccharide is from about $10^5$ to about $10^7$; $M^+$ is any ionic species effective to associate via electrostatic interactions with the carboxylic group present in the D-glucuronic acid unit, wherein $M^+$ includes, for example, but not necessarily limited to: $H^+$, $Na^+$, $K^+$, $NH4^+$, $½Ca^{+2}$ and $½Mg^{+2}$; substituents for the number 2 positions of all saccharide units ($R^3$, $R^5$, $R^8$, and $R^{10}$), substituents for the number 3 positions of the position number 4-linked saccharide units ($R^4$, $R^7$, and $R^9$), substituent for the number 4 position of the position 3-linked glucose unit ($R^2$), and substituents for the number 6 positions of the D-glucose units ($R^1$ and $R^6$) may be by non-limiting example a hydrogen (—H), methyl (—$CH_3$), acetyl (—$COCH_3$), glyceryl (—$COCH_2(OH)CH_2OH$) or a saccharide group containing one to three saccharides units, wherein the saccharide units present in the saccharide side-group include, but are not limited to: D-glucose, D-glucuronic acid, D-galacturonic acid, L-rhamnose, L-mannose, D-mannose, 2,3:5,6-gi-O-isopropylidene-D-mannofuranose, 2,3-O-isopropylidene-D-ribono-1,4-lactone, 3,4-O-isopropylidene-D-mannitol, D-arabinose, L-arabinose, D-erythrose, L-erythrose, D-fucose, L-fucose, lactulose, D-lyxose, maltulose, L-mannitol, D-mannono-1,4-lactone, L-mannono-1,4-lactone, methyl-α-D-fucopyranoside, D-ribonic acid, D-ribono-1,4-lactone, L-ribose, D-sorbose, D-tagatose, D-talitol, D-talose, L-xylose, and the like, and any derivatives. Also, the substituents $R^1$ thru $R^{11}$ above may differ from repeating unit to repeating unit within the heteropolysaccharide's backbone chemical structure. For example, $R^1$ could be hydrogen (—H) in one repeating unit and an acetyl group (—$COCH_3$) in the following repeating unit.

Suitable sphingans or derivatized sphingans include, but are not necessarily limited to, the following heteropolysaccharides and derivatives thereof:

gellan gum as described in Kuo, M. S., A. J. Mort, and A. Dell, Identification and location of L-glycerate, an unusual acyl substituent in gellan gum, Carbohydrate Research, 1986, 156: p. 173-187, wherein $R^1$, $R^2$, $R^3$, $R^4$, $R^5$, $R^6$, $R^7$, $R^8$, $R^9$, and $R^{10}$ are hydrogen (—H) groups, and $R^{11}$ is a methyl (—$CH_3$) group (or X=Rha);

welan gum as described by Stankowski, J. D. and S. G. Zeller, Location of the O-acetyl group in welan by the reductive-cleavage method, Carbohydrate Research, 1992, 224: p. 337-341, wherein $R^1$, $R^2$, $R^3$, $R^4$, $R^5$, $R^6$, $R^8$, $R^9$, and $R^{10}$ are hydrogen (—H) groups, $R^{11}$ is a methyl (—$CH_3$) group (or X=Rha), and $R^7$ is an α-L-rhamnose or α-L-mannose group (α-L-Rha (1→, or α-L-Man (1→);

diutan gum as described by Chowdhury, T. A., et al., Structural studies of an extracellular polysaccharide, S-657, elaborated by Xanthomonas ATCC 53159, Carbohydrate Research, 1987, 164: p. 117-122, wherein $R^1$, $R^2$, $R^3$, $R^4$, $R^5$, $R^6$, $R^8$, $R^9$, and $R^{10}$ are hydrogen (—H) groups, $R^{11}$ is a methyl (—$CH_3$) group (or X=Rha), and $R^7$ is two α-L-rhamnose groups linked at the 1,4 ring positions (α-L-Rha (1→4) α-L-Rha (1→);

heteropolysaccharide S-8 available from CP Kelco of 123 North Wacker Dr, Suite 2000 Chicago, Ill. 60606 USA, described by the manufacturer as a more pure strand of duitan gum with respect to the S-657 strand. Purity is defined by the manufacturer for this product as % Diutan=% $CO_2$*(Mass of diutan repeating unit)/(mass of $CO_2$). The repeat unit mass was 992.93, assuming no acetate and the $K^+$ form. Hence, for S-8 strain, 4.0% $CO_2$ content was reported and purity=4*992.93/44=90.3%, as compared with S-657, 3.2% $CO_2$ giving purity=3.2*992.93/44=72.2%.

rhamsan gum as described by Jansson, P. E., et al., Structural studies of a polysaccharide (S-194) elaborated by Alcaligenes ATCC 31961, Carbohydrate Research, 1986, 156: p. 157-163, wherein $R^2$, $R^3$, $R^4$, $R^5$, $R^6$, $R^7$, $R^8$, $R^9$, and $R^{10}$ are hydrogen (—H) groups, $R^{11}$ is a methyl (—$CH_3$) group (or X=Rha), and $R^1$ is two β-D-glucose groups linked at the 1,6 ring positions (β-D-Glc (1→6) β-D-Glc (1→);

heteropolysaccharide S-88 as described by Jannson, P. E., N. S. Kumar, and B. Lindberg, Structural studies of a polysaccharide (S-88) elaborated by Pseudomonas ATCC 31554, Carbohydrate Research, 1986, 156: p. 165-172, wherein $R^1$, $R^2$, $R^3$, $R^4$, $R^5$, $R^6$, $R^8$, $R^9$, and $R^{10}$ are hydrogen (—H) groups, $R^{11}$ is a methyl (—$CH_3$) group (X=Rha) or methylol (—$CH_2OH$) group (X=Man), and $R^7$ is an α-L-rhamnose group (α-L-Rha (1→);

heteropolysaccharide S-198 as described by Chowdhury, T. A., B. Lindberg, and U. Lindquist, Structural studies of an extracellular polysaccharide (S-198) elaborated by Alcaligenes ATCC 31853, Carbohydrate Research, 1987, 161: p. 127-132, wherein $R^1$, $R^3$, $R^4$, $R^5$, $R^6$, $R^7$, $R^8$, $R^9$, and $R^{10}$ are hydrogen (—H) groups, $R^{11}$ is a methyl (—$CH_3$) group (X=Rha) or methylol (—$CH_2OH$) group (X=Man), and $R^2$ is an α-L-rhamnose group (α-L-Rha (1→); and, heteropolysaccharide NW11 as described in Pollock, T. J., Sphingan Group of Exopolysaccharides (EPS), in Biopolymers, Vol. 5, E. J. Vandamme, S. DeBaets, and A. Steinbüchel, Editors, 2002, Wiley-VCH Verlag GmbH, p. 239-258, wherein $R^1$, $R^2$, $R^3$, $R^4$, $R^5$, $R^6$, $R^7$, $R^8$, $R^9$, and $R^{10}$ are hydrogen (—H) groups, and $R^{11}$ is a methylol (—$CH_2OH$) group (X=Man).

Preferably, the heteropolysaccharide used in fluids of the invention is a diutan gum having a tetrasaccharide repeating unit in the polymer backbone as represented by the chemical formula:

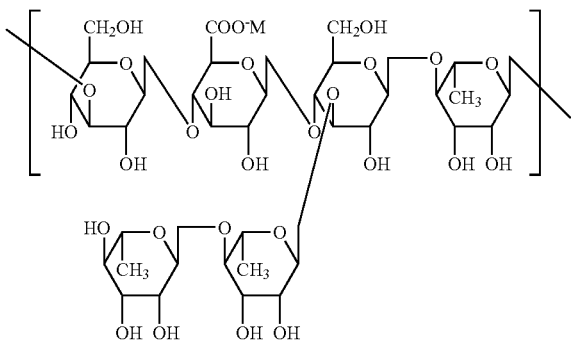

or represented by the alternative formula scheme:

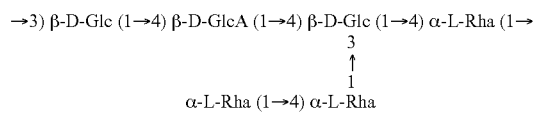

wherein $M^+$ is any ionic species effective to associate via electrostatic interactions with the carboxylic group, wherein $M^+$ includes, for example, but not necessarily limited to, $H^+$, $Na^+$, $K^+$, $NH4^+$, $½Ca^{+2}$ and $½Mg^{+2}$; and the weight average molecular weight (Mw) for the diutan gum is from about $10^5$ to about $10^7$. Diutan heteropolysaccharides are available, for example, from CP Kelco of 123 North Wacker Dr, Suite 2000 Chicago, Ill. 60606 USA, and may also be used in either crosslinked form, or without crosslinker. Diutan is generally composed of carbohydrate, about 12% protein and about 7% (calculated as O-acetyl) acyl groups, where the carbohydrate portion containing about 19% glucuronic acid, and the neutral sugars rhamnose and glucose are present in the approximate ratio of 2:1. Details of preparing diutan are given in U.S. Pat. No. 5,175,278 (Peik et al.), hereby incorporated by reference. O-acetyl groups may also be present on the number 2 position and the 2,6-positions of the 3-linked D-Glucose unit as described in Diltz, S. and S. G. Zeller, Location of O-acetyl groups in S-657 using the reductive-cleavage method. Carbohydrate Research, 2001. 331: p. 265-270.

Heteropolysaccharides are incorporated into the liquid phase of a fluid in amounts ranging from about 0.1% to about 2.0% by weight of total weight of liquid phase. The term liquid phase means all components of the fluid except the optional gas component. In one embodiment, the heteropolysaccharide is incorporated in an amount from about 0.2% to about 1.0% by weight of total weight of liquid phase. While the amount of heteropolysaccharide may range from about 0.1% to about 2.0% by weight of total weight of liquid phase, the lower limit may be at least about 0.1, 0.2, 0.3, 0.4, 0.5, 0.6, 0.7, 0.8, 0.9, 1.0, 1.2, 1.4, 1.6, or 1.8% by weight of total weight of liquid phase, and the upper limit may be no greater than about 2.0, 1.9, 1.8, 1.7, 1.6, 1.5, 1.4, 1.3, 1.2, 1.1, 1.0, 0.8, 0.6, 0.4, or 0.2% by weight of total weight of liquid phase.

The fluids used in the invention may include an electrolyte which may be an organic acid, organic acid salt, or salt. Mixtures of the above members are also contemplated as falling within the scope of the invention. When incorporated, the salt will typically be present in an amount from about 2% w/v to about 400% w/v, from about 4% w/v to about 300% w/v, from about 10% w/v to about 250% w/v, from about 50% w/v to about 250% w/v, from about 100% w/v to about 250% w/v, from about 150% w/v to about 250% w/v, from about 200% w/v to about 250% w/v, or even from about 200% w/v to about 300% w/v.

The organic acid is typically a sulfonic acid or a carboxylic acid, and the anionic counter-ion of the organic acid salts is typically a sulfonate or a carboxylate. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred organic acids are formic acid, citric acid, 5-hydroxy-1-napthoic acid, 6-hydroxy-1-napthoic acid, 7-hydroxy-1-napthoic acid, 1-hydroxy-2-naphthoic acid, 3-hydroxy-2-naphthoic acid, 5-hydroxy-2-naphthoic acid, 7-hydroxy-2-napthoic acid, 1,3-dihydroxy-2-naphthoic acid, and 3,4-dichlorobenzoic acid.

The salt, inorganic salt or organic salt, that are particularly suitable include, but are not limited to, water-soluble potassium, sodium, and ammonium salts, such as potassium chloride, sodium bromide, and ammonium chloride. Additionally, magnesium chloride, calcium chloride, calcium bromide, zinc halide, sodium carbonate, cesium formate, and sodium bicarbonate salts may also be used. Preferred inorganic salts include alkali metal halides, more preferably potassium chloride and sodium bromide. The carrier brine phase may also comprise an organic salt more preferably sodium, potassium or cesium formate. Preferred inorganic divalent salts include calcium halides, more preferably calcium chloride or calcium bromide. Potassium bromide, or cesium bromide may also be used. The salt is chosen for compatibility reasons i.e. where the reservoir drilling fluid used a particular brine phase and the completion/clean up fluid brine phase is chosen to have the same brine phase. Any mixtures of the salts may be used as well. The salts may aid in the development of increased viscosity and or density that is characteristic of preferred fluids. Further, the salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. In a preferred embodiment of the invention, the electrolyte is potassium chloride. The electrolyte may be used at any suitable level for the function of the salt. When the salt is used to adjust the density of the fluid, the salt may be used to adjust to any suitable density. When the salt is sodium bromide, it is preferably incorporated in an amount of from about 10% w/v to about 80% w/v. When the salt is cesium formate, it is preferably incorporated in an amount of from about 40% w/v to about 240% w/v.

Organoamino compounds may also be used in fluids used according to the invention. Examples of suitable organoamino compounds include, but are not necessarily limited to, tetraethylenepentamine, triethylenetetramine, pentaethylenhexamine, triethanolamine, and the like, or any mixtures thereof. When organoamino compounds are used in fluids of the invention, they are incorporated at an amount from about 0.01 wt % to about 2.0 wt % based on total liquid phase weight. Preferably, when used, the organoamino compound is incorporated at an amount from about 0.05 wt % to about 1.0 wt % based on total liquid phase weight. A particularly useful organoamino compound is tetraethylenepentamine.

Energized fluids used in some embodiments of the invention also include a surfactant. Any surfactant for which its ability to aid the dispersion and/or stabilization of the gas component into the base fluid to form an energized fluid is readily apparent to those skilled in the art may be used. Viscoelastic surfactants, such as those described in U.S. Pat. Nos. 6,703,352 (Dahayanake et al.) and 6,482,866 (Dahayanake et al.), both incorporated herein by reference, are also suitable for use in fluids of the invention. In some embodiments of the invention, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, -olefin sulfonates, alkyl ether sulfates, alkyl phosphates and alkyl ether phosphates. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some embodiments of the invention, the surfactant is a cationic, zwitterionic or amphoteric surfactant containing and amine group or a quaternary ammonium group in its chemical structure ("amine functional surfactant"). A particularly useful surfactant is the amphoteric alkyl amine contained in the surfactant solution AQUAT 944™ (available from Baker Petrolite of 12645 W. Airport Blvd, Sugar Land, 77478 USA). In other embodiments of the invention, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids of the invention. Preferably the fluids incorporate the surfactant or blend of surfactants in an amount of about 0.02 wt % to about 5 wt % of total liquid phase weight, and more preferably from about 0.05 wt % to about 2 wt % of total liquid phase weight.

Friction reducers may also be incorporated into fluids used in embodiments of the invention. Any friction reducer may be used. Also, polymers such as polyacrylamide, polyisobutyl methacrylate, polymethyl methacrylate and polyisobutylene as well as water-soluble friction reducers such as guar gum, guar gum derivatives, polyacrylamide, and polyethylene oxide may be used. Commercial drag reducing chemicals such as those sold by Conoco Inc. under the trademark "CDR" as described in U.S. Pat. No. 3,692,676 (Culter et al.) or drag reducers such as those sold by Chemlink designated under the trademarks "FLO 1003, 1004, 1005 & 1008" have also been found to be effective. These polymeric species added as friction reducers or viscosity index improvers may also act as excellent fluid loss additives reducing or even eliminating the need for conventional fluid loss additives.

A fiber component may be included in the fluids to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (for example, polyester, polyaramide, polyamide, novoloid or a novoloid-type polymer), fibrillated synthetic organic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON™ polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be include at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Fluids used in the invention may further contain other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, alcohols, mutual solvents, scale inhibitors, corrosion inhibitors, fluid-loss additives, bactericides, and the like. Also, they may include a co-surfactant to optimize viscosity or to minimize the formation of stable emulsions that contain components of crude oil or a polysaccharide or chemically modified polysaccharide, polymers such as cellulose, derivatized cellulose, guar gum, derivatized guar gum, xanthan gum, or synthetic polymers such as polyacrylamides and polyacrylamide copolymers, oxidizers such as ammonium persulfate and sodium bromate, oxygen scavengers such as sodium thiosulfate and biocides such as 2,2-dibromo-3-nitrilopropionamine.

The following examples are presented to illustrate the preparation and properties of energized aqueous fluids comprising heteropolysaccharides and a surfactant, and should not be construed to limit the scope of the invention, unless otherwise expressly indicated in the appended claims. All percentages, concentrations, ratios, parts, etc. are by weight unless otherwise noted or apparent from the context of their use.

EXAMPLES

Viscosity measurements reported in examples 1 through 3 were performed in Fann 50 viscometers (Fann Instrument Co., 15112 Morales Road, Houston, Tex. 77032) at the temperatures of interest, and at a constant shear rate of $170 \text{ s}^{-1}$. For measurements performed above normal boiling point, nitrogen pressure of 2.8 megapascals was imposed on the fluid from the beginning of the experiment to prevent water evaporation. The viscometers were connected to a data acquisition systems provided with a software interface that calculates fluid viscosities from torque measurements as described in the API Recommended Practice 39, Recommended Practices on Measuring the Viscous Properties of a Cross-linked Water-base Fracturing Fluid, 1998.

In a typical temperature cycling experiment, a fluid sample was placed at room temperature in the viscometer and viscosity measurements were started. The fluid was then heated so temperature increased at an initial rate of approximately 1° C. every ten seconds, or less than 1° C. every ten seconds as the temperature of the fluid approached the desired final temperature. When this temperature was reached, it was the held constant during one hour while viscosity measurements continued. Then, temperature was reduced at a rate of approximately 1° C. every ten seconds, or less than 1° C. every ten seconds as the temperature of the fluid approached room temperature. The procedure was repeated in subsequent cycles without removing the sample from the viscometer.

Example 1

Table 1 summarizes viscosity measurements for a fluid composition containing heteropolysaccharide S-657 at a concentration of 0.5 wt. % and sodium bromide at a concentration of 51% w/v. The density of this fluid at 25° C. was 1.4 kg/l.

TABLE 1

| Cycle | Initial temperature (° C.) | Viscosity at initial temperature (mPa · s) | Final temperature (° C.) | Viscosity at final temperature (mPa · s) |
|---|---|---|---|---|
| 1 | 27.1 | 60 | 141 | 50 |
| 2 | 27.8 | 61 | 139 | 56 |
| 3 | 31.1 | 68 | 140 | 59 |
| 4 | 31.6 | 69 | 140 | 61 |

The viscosity at final temperature that is reported in Table 1 corresponds to the viscosity of the fluid after one hour at such temperature. Table 1 illustrates that viscosity of the formulation described above was maintained or slightly increased after successive temperature cycles without need of replenishing the fluid with additional heteropolysaccharide S-657.

Example 2

Table 2 summarizes viscosity measurements for a fluid composition containing heteropolysaccharide S-8 at a concentration of 0.5 wt. % and sodium bromide at a concentration of 51% w/v. The density of this fluid at 25° C. was 1.4 kg/l.

TABLE 2

| Cycle | Initial temperature (° C.) | Viscosity at initial temperature (mPa · s) | Final temperature (° C.) | Viscosity at final temperature (mPa · s) |
|---|---|---|---|---|
| 1 | 27.1 | 83 | 138 | 78 |
| 2 | 26.9 | 89 | 137 | 78 |
| 3 | 27.5 | 89 | 138 | 79 |
| 4 | 27.3 | 88 | 140 | 76 |

As in the previous example, the viscosity at final temperature that is reported in Table 2 corresponds to the viscosity of the fluid after one hour at such temperature. Table 2 illustrates that viscosity of the formulation described above was maintained practically unchanged after successive temperature cycles without need of replenishing the fluid with additional heteropolysaccharide S-8.

Example 3

Table 3 summarizes viscosity measurements for a fluid composition containing heteropolysaccharide S-8 at a concentration of 0.5 wt. % and cesium formate at a concentration of 130 w/v %. The density of this fluid at 25° C. was 1.9 kg/l.

TABLE 3

| Cycle | Initial temperature (° C.) | Viscosity at initial temperature (mPa · s) | Final temperature (° C.) | Viscosity at final temperature (mPa · s) |
|---|---|---|---|---|
| 1 | 24.4 | 31.1 | 140.4 | 126.4 |
| 2 | 37.2 | 132.8 | 140.4 | 134.5 |
| 3 | 39.3 | 138.0 | 140.3 | 135.3 |
| 4 | 29.4 | 138.7 | 140.2 | 136.6 |

As in the previous examples, the viscosity at final temperature that is reported in Table 3 corresponds to the viscosity of the fluid after one hour at such temperature. Table 3 illustrates that viscosity of the formulation described above was maintained or increased after successive temperature cycles without need of replenishing the fluid with additional heteropolysaccharide S-8.

Example 4

This example illustrates the benefits of the formulations disclosed in this invention in regards to their ability to maintain sufficient viscosity for proper well cleanout upon continuous recirculation without exhibiting significant degradation due to shearing, and also to reductions in energy requirements to maintain flow. Resiliency to shear degradation and reduced frictional pressure losses are known by those skilled in the art as important properties for efficient well cleanout fluids.

The experimental setup consisted of a 5.6-m$^3$ mixing tank connected to a hydraulic pump with flow capacity of up to 640 L/min. The discharge of the pump was connected in such a way that the flow could be directed to one of two coiled tubing reels, one with external diameter of 3.81 cm (1.5 in), internal diameter of 3.12 cm and length of 3810 m, and another with external diameter of 4.45 cm (1.75 in), internal diameter of 3.96 cm and length 1370 m. The discharges of the coiled tubing reels were connected in a manner that the flow was returned to the mixing tank. Pressure transducers were placed in both ends of the coiled tubing reels to measure frictional pressure losses.

In a typical test, 4.0 m$^3$ of the fluid of interest were mixed and circulated through the configuration described above with increasing flowrate (initial rate of 2.4 m$^3$/h with 2.4 m$^3$/h increments) until reaching either the maximum flowrate of the pump or the maximum operating pressure of the system. Recirculation was allowed for each flowrate until a steady pressure differential was attained, and the corresponding measurement was recorded. Experiments were performed first with the flow directed to the coiled tubing with external diameter of 3.81 cm, and second with the flow directed to the coiled tubing with 4.45 cm. At the end of a test for given coiled tubing, the fluid was displaced from the reel and back to the mixing tank by pumping nitrogen through the system. Each batch of fluid was therefore subject to significant shearing, since it was recirculated through the system at each flowrate and also through each coiled tubing reel. Viscosity measurements at two different shear rates (170 s$^{-1}$ and 511

$s^{-1}$) and at room temperature were performed on samples of the fluid as deemed necessary to assess their resilience to shear-induced degradation.

Two formulations were considered for this example. Formulation 1 comprised potassium chloride (10% w/v) in water. Formulation 2 comprised potassium chloride (10 w/v %) and heteropolysaccharide S-8 (0.4 percent by weight based on total fluid weight) in water. The density of these fluids at 25° C. was 1.0 kg/l. Table 4 summarizes frictional pressure measurements for these formulations following the experimental procedure described above.

TABLE 4

| Flowrate ($m^3$/h) | Pressure drop in coiled tubing with external diameter of 3.81 cm | | Pressure drop in coiled tubing with external diameter of 4.45 cm | |
|---|---|---|---|---|
| | Formulation 1 | Formulation 2 | Formulation 1 | Formulation 2 |
| 2.4 | 342 | 672 | 44 | 446 |
| 4.8 | 1237 | 1199 | 579 | 744 |
| 7.2 | 2425 | 1788 | 1286 | 1067 |
| 9.5 | 3929 | 2439 | 2100 | 1408 |
| 11.9 | 5726 | 3178 | 3044 | 1753 |
| 14.3 | 7853 | 3983 | 4084 | 2138 |
| 16.7 | 10299 | 4859 | 5265 | 2513 |
| 19.1 | 13039 | 5800 | 6547 | 2944 |
| 21.5 | 16105 | 6821 | 7953 | 3362 |
| 23.8 | — | — | 9480 | 3817 |
| 26.2 | — | — | 11118 | 4290 |
| 28.6 | — | — | 12859 | 4775 |
| 31.0 | — | — | 14737 | 5283 |
| 33.4 | — | — | 16729 | 5808 |
| 35.8 | — | — | 18837 | 6348 |

Data reported in Table 4 show the beneficial effects of heteropolysaccharides relevant to this invention as frictional pressure reducers for conventional coiled tubing configurations when low-density brines are circulated through the system. The reduction in frictional pressure is particularly significant at flowrates above 9.5 $m^3$/h (1 bbl/min), which are commonly used in coiled tubing operations and for which frictional pressure limitations would otherwise constrain the ability to pump at such rates. Furthermore, as the frictional pressure with the formulation comprising the heteropolysaccharide is consistently low at high flowrates may suggest that the heteropolysaccharide did not undergo significant shear-induced degradation.

Viscosity measurements for samples of Formulation 2 that were collected throughout the tests are reported in Table 5. Recirculation time corresponds to the total time that the fluid was circulated through the system. Flowrate and coiled tubing string correspond to the actual flowrate and tubing string that was being tested at the time of collection of the corresponding sample.

TABLE 5

| Recirculation Time (min) | Viscosity at 170 s-1 (mPa · s) | Viscosity at 511 s-1 (mPa · s) | Flowrate | Coiled tubing string |
|---|---|---|---|---|
| 0 | 54 | 22 | — | — |
| 2 | 60 | 25 | 2.4 | 3.81 |
| 25 | 61 | 25 | 21.5 | 3.81 |
| 28 | 61 | 25 | 2.4 | 4.45 |
| 74 | 61 | 25 | 35.8 | 4.45 |

It is seen in Table 5 that viscosity initially increased with recirculation, and then remained constant through the testing. The initial increase in viscosity is due to the additional mixing that occurs while the fluid is circulated, which aided the dispersion and further hydration of the heteropolysaccharide. The fact that the viscosity remained constant confirms that significant degradation of the heteropolysaccharide due to shearing did not occur. These data illustrate that the formulations disclosed in this invention render viscous fluids with excellent resilience to shear degradation and reduced frictional pressures.

Example 5

This example also illustrates the benefits of the formulations disclosed in this invention in regards to their ability to maintain sufficient viscosity for proper well cleanout upon continuous recirculation without exhibiting significant degradation due to shearing, and also to reductions in energy requirements to maintain flow.

Two formulations were considered for this example. Formulation 3 comprised sodium bromide (51% w/v) in water. Formulation 4 comprised sodium bromide (51% w/v) and heteropolysaccharide S-8 (0.4 wt. %) in water. The density of these fluids at 25° C. was 1.4 kg/l. Table 6 summarizes frictional pressure measurements for these formulations following the experimental procedure described for the preceding example.

TABLE 6

| Flowrate ($m^3$/h) | Pressure drop in coiled tubing with external diameter of 3.8 cm | | Pressure drop in coiled tubing with external diameter of 4.5 cm | |
|---|---|---|---|---|
| | Formulation 3 | Formulation 4 | Formulation 3 | Formulation 4 |
| 2.4 | 452 | 1186 | 20 | 822 |
| 4.8 | 1647 | 1818 | 385 | 1293 |
| 7.2 | 3299 | 2534 | 1126 | 1803 |
| 9.5 | 5399 | 3368 | 2063 | 2365 |
| 11.9 | 7962 | 4314 | 3233 | 2962 |
| 14.3 | 10973 | 5352 | 4610 | 3584 |
| 16.7 | 14445 | 6505 | 6188 | 4279 |
| 19.1 | 18372 | 7773 | 7997 | 4981 |
| 21.5 | — | — | 10035 | 5752 |
| 23.8 | — | — | 12271 | 6543 |
| 26.2 | — | — | 14719 | 7382 |
| 28.6 | — | — | 17397 | 8264 |

Data reported in Table 6 show the beneficial effects of heteropolysaccharides relevant to this invention as frictional pressure reducers for conventional coiled tubing configurations when brines used in denser formulations are circulated through the system. As in the previous example, the reduction in frictional pressure was particularly significant at flowrates above 9.5 m3/h (1 bbl/min). Furthermore, the fact that frictional pressure with the formulation comprising the heteropolysaccharide is consistently low is indicative that the heteropolysaccharide did not exhibit significant shear-induced degradation.

Viscosity measurements for samples of Formulation 4 that were collected throughout the tests are reported in Table 6. As in the previous example, recirculation time corresponds to the total time that the fluid was circulated through the system. Flowrate and coiled tubing string correspond to the actual flowrate and tubing string that was being tested at the time of collection of the corresponding sample.

TABLE 7

| Recirculation Time (min) | Viscosity at 170 s-1 (mPa·s) | Viscosity at 511 s-1 (mPa·s) | Flowrate (m³/h) | Coiled tubing string diameter |
|---|---|---|---|---|
| 0 | 62 | 24 | — | — |
| 2 | 64 | 25 | 2.4 | 3.81 |
| 21 | 66 | 26 | 19.1 | 3.81 |
| 24 | 66 | 26 | 2.4 | 4.45 |
| 60 | 66 | 26 | 28.6 | 4.45 |

As in the previous example, it is seen in Table 7 that viscosity initially increased slightly with recirculation due to additional mixing, and then remained constant through the testing. The fact that the viscosity remained constant confirms that significant degradation of the heteropolysaccharide due to shearing did not occur. These data illustrate that the formulations disclosed in this invention render viscous fluids with excellent resilience to shear degradation and reduced frictional pressures.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of performing wellbore cleanout operation comprising:
   a. preparing and injecting into a wellbore an aqueous fluid comprising a sphingan heteropolysaccharide;
   b. entraining wellbore fill material in the aqueous fluid in the wellbore;
   c. recovering at the surface at least a portion of the fluid and the entrained wellbore fill material for substantial separation of the wellbore fill material from the fluid; and
   d. injecting the portion of the fluid into the wellbore for a second cycle;
   wherein no replenishment of the sphingan heteropolysaccharide is required.

2. The method of claim 1 further comprising de-gassing of the fluid upon recovering the fluid at the surface.

3. The method of claim 1 further comprising substantially removing organic materials from the fluid recovered at the surface.

4. The method of claim 1 wherein the heteropolysaccharide is selected from the group consisting of gellan gum and gellan gum derivatives, welan gum and welan gum derivatives, diutan gum and diutan gum derivatives, rhamsan gum and rhamsan gum derivatives, polysaccharide S-8 and polysaccharide S-8 derivatives, polysaccharide S-88 and polysaccharide S-88 derivatives, polysaccharide S-198 and polysaccharide S-198 derivatives, polysaccharide S-657 and polysaccharide S-657 derivatives, polysaccharide NW11 and polysaccharide NW11 derivatives, and any mixtures thereof.

5. The method of claim 1 wherein the sphingan heteropolysaccharide is a heteropolysaccharide with a tetrasaccharide repeating unit in the polymer backbone as represented by the chemical formula:

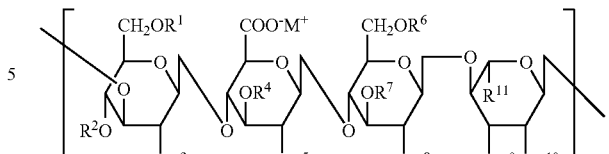

wherein at least three different saccharides are present in the repeating unit, such saccharides including D-glucose, D-glucuronic acid, and either L-rhamnose or L-mannose; $M^+$ is an ionic species; $R^1$, $R^2$, $R^3$, $R^4$, $R^5$, $R^6$, $R^7$, $R^8$, $R^9$, and $R^{10}$ are selected from the group consisting of hydrogen, methyl, acetyl, glyceryl, or a saccharide group containing one to three saccharides units; $R^{11}$ is a methyl or methylol group; and the weight average molecular weight (Mw) for the heteropolysaccharide is from about $10^5$ to about $10^7$; and,
wherein the fluid further comprises an electrolyte.

6. The method of claim 5 wherein the sphingan heteropolysaccharide is diutan gum having a tetrasaccharide repeating unit in the polymer backbone as represented by the chemical formula:

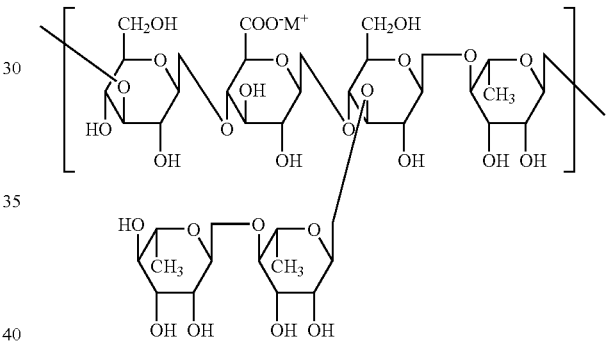

wherein $M^+$ is an ionic species, and the weight average molecular weight (Mw) from about $10^5$ to about $10^7$.

7. The method of claim 1 wherein the sphingan heteropolysaccharide is incorporated in an amount from about 0.1% to about 2.0% by weight of total liquid phase weight.

8. The method of claim 7 wherein the sphingan heteropolysaccharide is incorporated in an amount from about 0.2% to about 1.0% by weight of total liquid phase weight.

9. The method of claim 1, the fluid further comprising an electrolyte selected from the group consisting of organic acids, organic acid salts, inorganic salts, and combinations of one or more organic acids or organic acid salts with one or more inorganic salts, and the electrolyte is incorporated in an amount of from about 2% to about 240% weight-to-volume ratio.

10. The method of claim 9 wherein the electrolyte is sodium bromide and is incorporated in an amount of from about 10% to about 80% weight-to-volume ratio.

11. The method of claim 9 wherein the electrolyte is cesium formate and is incorporated in an amount of from about 80% to about 240% weight-to-volume ratio.

12. The method of claim 1 wherein the fluid further comprises a gas component.

13. The method of claim 12 wherein the gas component is nitrogen.

14. The method of claim 12 wherein the gas component comprises from about 10% to about 90% of total fluid volume percent, preferably from about 30% to about 80% of total fluid volume percent, and more preferably from about 40% to about 70% of total fluid volume percent.

15. The method of claim 1, the fluid further comprising an organoamino compound.

16. The method of claim 15 wherein the organoamino compound is selected from the group consisting of tetraethylenepentamine, triethylenetetramine, pentaethylenhexamine, triethanolamine, and any mixtures thereof, and the organoamino compound is incorporated in an amount from about 0.01 wt % to about 2.0 wt % based on total liquid phase weight, and preferably in an amount from about 0.05 wt % to about 1.0 wt % based on total liquid phase weight.

17. The method of claim 1, the fluid having a density from about 1.0 to about 2.3 kg/l.

18. The method of claim 17, the fluid having a density from about 1.1 to about 2.1 kg/l.

19. The method of claim 18, the fluid having a density from about 1.3 to about 1.9 kg/l.

20. The method of claim 1 further comprising:
e. entraining wellbore fill material in the aqueous fluid after injecting the portion of the fluid into the wellbore for a second cycle;
f. recovering at the surface at least a portion of the fluid injected into the wellbore for a second cycle with entrained wellbore fill material for substantial separation of the wellbore fill material from the fluid injected into the wellbore for a second cycle; and
g. injecting the portion of the fluid recovered in step f. into the wellbore for a third cycle;
wherein no replenishment of the heteropolysaccharide is required.

21. The method of claim 20 further comprising:
h. entraining wellbore fill material in the aqueous fluid after injecting the portion of the fluid into the wellbore for a third cycle;
i. recovering at the surface at least a portion of the fluid injected into the wellbore for a third cycle with entrained wellbore fill material for substantial separation of the wellbore fill material from the fluid injected into the wellbore for a third cycle; and
j. injecting the portion of the fluid recovered in step i. into the wellbore for a fourth cycle;
wherein no replenishment of the heteropolysaccharide is required.

22. A method of treating a wellbore comprising:
a. preparing and injecting into a wellbore, an aqueous fluid comprising a sphingan heteropolysaccharide;
b. entraining wellbore fill material in the aqueous fluid in the wellbore and recovering at the surface at least a portion of the fluid;
c. injecting the portion of the fluid into the wellbore for a second cycle;
d. treating the wellbore after injecting the portion of the fluid into the wellbore for a second cycle;
e. recovering at the surface at least a portion of the fluid injected into the wellbore for a second cycle; and
f. injecting the portion of the fluid recovered in step e. into the wellbore for a third cycle, wherein no replenishment of the heteropolysaccharide is required.

23. The method of claim 22 as used in wellbore cleanout operations.

24. The method of claim 22 as used in drilling, drill-in, displacement, completion, hydraulic fracturing, work-over, packer fluid emplacement, maintenance, well treating, testing, or abandonment operations.

* * * * *